United States Patent [19]

Kiernan et al.

[11] Patent Number: 5,701,137
[45] Date of Patent: Dec. 23, 1997

[54] METHOD FOR SEPARATING A HIERARCHICAL TREE CONTROL INTO ONE OR MORE HIERARCHICAL CHILD TREE CONTROLS IN A GRAPHICAL USER INTERFACE

[75] Inventors: Casey L. Kiernan; Gavin Jancke, both of Redmond, Wash.

[73] Assignee: Microsoft Corporation, Redmond, Wash.

[21] Appl. No.: 448,830

[22] Filed: May 24, 1995

[51] Int. Cl.$^6$ .................................................. G06F 3/00
[52] U.S. Cl. ..................... 345/119; 395/356; 395/357
[58] Field of Search .......................... 345/119; 395/155, 395/160, 161, 157, 600, 356, 357; 434/118; 364/229.4, 966.2

[56] References Cited

U.S. PATENT DOCUMENTS

| | | | |
|---|---|---|---|
| 4,613,946 | 9/1986 | Forman | 364/518 |
| 5,065,347 | 11/1991 | Pajak et al. | 395/160 X |
| 5,262,761 | 11/1993 | Scandura et al. | 395/160 X |
| 5,412,776 | 5/1995 | Bloomfield et al. | 395/160 |
| 5,428,554 | 6/1995 | Laskoski | 395/160 X |
| 5,491,795 | 2/1996 | Beaudet et al. | 395/160 X |
| 5,504,853 | 4/1996 | Schuur et al. | 395/160 |
| 5,515,487 | 5/1996 | Beaudet et al. | 395/160 X |
| 5,559,945 | 9/1996 | Beaudet et al. | 395/160 X |

OTHER PUBLICATIONS

Windows® 95 Software Development Kit, "Multiple Document Interface," Chapter 27, pp. 43–70.

"Chapter 3: A Guided Tour of Microsoft Windows, pp. 31–36; Chapter 7: File Manager", pp. 105–117, Microsoft Windows User's Guide, Operating System Version 3.1, 1993.

*Primary Examiner*—Raymond J. Bayerl
*Assistant Examiner*—Seth D. Vail
*Attorney, Agent, or Firm*—Klarquist Sparkman Campbell Leigh & Whinston, LLP

[57] ABSTRACT

A method for interactive display of a graphical tree structure in a windowing environment. A tree control graphically represents hierarchical data. The user can separate a portion of a tree control at a node and create a new tree control for viewing and editing. Changes to a newly created tree control propagate through to related tree controls.

24 Claims, 11 Drawing Sheets

METHOD FOR SEPARATING A HIERARCHICAL TREE CONTROL INTO ONE OR MORE HIERARCHICAL CHILD TREE CONTROLS IN A GRAPHICAL USER INTERFACE

TECHNICAL FIELD OF THE INVENTION

The invention generally relates to a graphical user interface of a programmed computer system. More specifically, the invention relates to a graphical user interface where hierarchical data is represented in a tree structure.

BACKGROUND OF THE INVENTION

A variety of application programs and operating systems include a user interface feature enabling users to view a listing of information stored on a computer. For example, the Windows operating system from Microsoft Corporation includes a File Manager program to help the user keep track of files stored in the computer. Since even simple PCs have the capacity to store thousands of files, it is important for many applications to include an effective means for viewing lists of information stored on a computer.

Large lists of files, directories and other computer resources are much easier to understand when portrayed in a hierarchical fashion. A hierarchical representation is an effective method of listing computer resources because it groups related subject matter together in a manner that enables the user to locate desired items more easily. One way to represent a hierarchy is to use a tree structure. A tree structure includes a number of reference points called nodes that together comprise a tree. The origin or base of a tree is called the root node, which is characterized as having no parent nodes. Every other node has only one parent and potentially one or more children nodes. A leaf is the lowest node in the hierarchy of the tree and thus has no children. This concept of a tree structure can be applied to many types of data or computer resource classifications.

One example of this tree structure is a file system where related information is grouped together using a hierarchy of sub-directories. In this example, the main directory is the root node of the tree, and a number of sub-directories to the main directory are its child nodes. Each sub-directory can be broken into a number of other sub-directories to achieve additional layers of hierarchy. At each level of hierarchy, there may be a number of files, which are leaf nodes of the tree structure. In addition to directories of files, the concept of a tree structure can be extended to other arbitrary groupings of data.

While using a tree structure is an effective way to represent complex information stored in a computer, it is important for the computer to display information such that the user can easily browse through it. It is quite typical to have complex tree structures in today's computer systems, especially considering the growing memory capacity of the typical personal computer. Computer network applications add further complexity because of the vast amount of data that can be distributed across a network.

Network database applications especially require an effective user interface to represent database resources distributed across a network. In a typical network database configuration, it is not unusual to have a large number of server database applications distributed throughout a computer network. Each server database application in the network can be associated with a very complex hierarchy of information. As a result, it is very difficult for users to locate desired information without an effective user interface to view and navigate through the complex hierarchy of information distributed across the network.

A text-based user interface can be used to navigate information stored in a hierarchical tree structure, but such user interfaces are rather limited. These text-based user interfaces do not convey enough information about the overall hierarchy to the user because they can only display a flat listing of one level of the hierarchy at a time. Unless the user can remember where an item is located in the tree structure, he/she often has to repeatedly page through levels of hierarchy before finding the proper path to the desired item.

User interfaces displaying a graphical representation of a tree structure offer a more effective interface than the text-based approach. The File Manager interface for example, graphically displays the hierarchy of a file system. It allows the user to view several layers of hierarchy at once, and also enables the user to interactively expand nodes in the tree structure. A user can "expand" a node by selecting and clicking on a parent node, causing the File Manager to show child nodes of the parent node.

While graphical user interfaces such as the File Manager feature in Windows operating systems provide better performance, they do not provide an effective interface for very large and complex tree structures such as those typically encountered in network database applications. One drawback of the File Manager product is that it only allows the user to view one portion of a tree at one time. The user cannot break up the tree into smaller more manageable pieces of information. The File Manager does allow a user to expand a leaf in the tree, but the utility of this feature is limited. When a user expands a tree in a node, the File Manager interface displays a separate window containing a flat list of child nodes of the parent node. This separate window does not represent a separate and new hierarchical tree; but rather, it merely represents a flat list of nodes similar to the flat list provided in text-based interfaces.

In general, graphical user interfaces for navigating hierarchical structures are limited by the standard size of display screens on today's computer systems. It is very difficult for a user to navigate through complex tree structures when the display screen can only accommodate a very small portion of the tree structure. There is a need therefore for an improved user interface that enables users to more easily and effectively navigate through complex hierarchies of information stored in a computer system.

SUMMARY OF THE INVENTION

Addressing the drawbacks of existing user interface applications, the invention provides a method for interactive display of a graphical tree structure. In one implementation of the invention, the user can separate or "rip" a graphical tree structure into a smaller, more manageable tree for viewing and editing. In this case, the graphical tree structure is implemented as a tree control in a windowing environment. A user can rip a portion of a tree control using a drag and drop technique: the user positions a cursor over a node, clicks the mouse button down, drags the mouse outside a window, and then releases the mouse button to create a new tree control. The user can then view and navigate the new tree control, which represents a more manageable portion of the original tree control.

The method according to the invention is typically implemented in a user interface application in a windowing environment. For instance in the windowing interface introduced above, a user interface application stores a master tree structure in memory. In a first window, the application displays a master tree control corresponding to a portion of the tree structure. In response to a user command to separate the tree into another tree, the application creates a new tree control starting from the node selected by the user. Displayed in a new window, the newly created tree control is a client of the master tree. The master tree control manages the underlying data representing a tree structure, and it communicates with one or more clients to update their display status.

When incorporated into a user interface application, the invention makes the user interface much easier to use. Instead of having to navigate through a long and complicated list of information, the user can create a smaller, more manageable tree that is easier to view on a computer monitor. The user can even edit a newly created tree as if it were the original tree. To support this feature, the invention enables changes to a newly created tree to be propagated to all related trees. As a result, the user can edit the underlying data of the tree from a variety of views without concern as to whether the application will properly update the data.

Further advantages and features of the invention will become apparent with reference to the following detailed description and accompanying drawings.

DETAILED DESCRIPTION

The invention provides a method and system for interactively displaying a tree structure in a programmed computer system. We begin with a description of a computer system in which an embodiment of the invention is implemented. Next we describe examples of a graphical tree structure. We then describe the architecture of an embodiment of the invention. Finally, we describe the operation of the embodiment.

Figure 1:
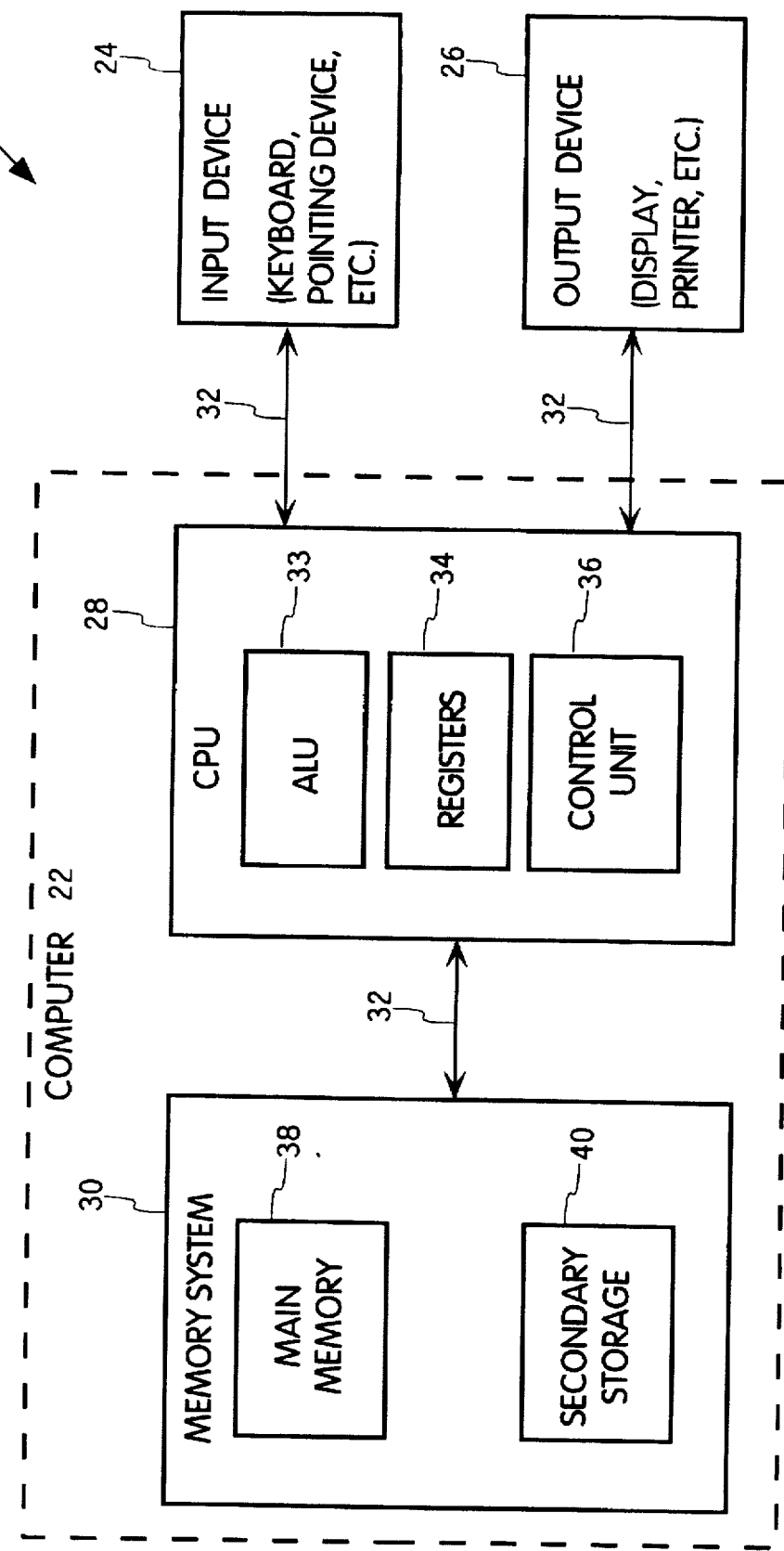
FIG. 1 is a block diagram showing the architecture of a computer system in which the invention may be implemented.

FIG. 1 is a block diagram of a computer system 20 which is used to implement a method and system embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical, magnetic or other recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, modem, printer, sound device or other device for providing output data from the computer.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. As another example, the invention may be implemented in an Apple Macintosh computer from Apple Computer. The Macintosh computer system is based on the MC68000 family of processors from Motorola Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

An operating system, loaded into memory of the computer system, provides a number of low level functions to support the operation of an embodiment of the invention. In general, the operating system is responsible for controlling the allocation and usage of a hardware resources such as memory, CPU time, disk space, and peripheral devices. As is well-known, operating systems provide such low level functions as module (process and dynamic link library) management, scheduling, interprocess messaging, memory management, file system management, and graphical user interface support.

A number of well-known operating systems are available for the computers listed above. For instance, the Microsoft DOS and Windows operating systems are widely used for computer systems based on the X86 family of processors from Intel Corporation. As another example, the Windows NT operating system can be used with computer systems based on the X86 family of Intel processors as well as RISC machines. As yet another example, the UNIX operating system and variations of it are widely used on a variety of computer systems.

Though the invention can be implemented using variety of different operating systems, the embodiment to be described is implemented in a computer system installed with a Windows operating system from Microsoft. The embodiment takes advantage of the Windows Application Programming Interface (Win32 API) from Microsoft Corporation to support a graphical windowing environment. A description of the Windows API is available from Microsoft Corporation in the Windows 95 Software Developers' Kit (SDK), as well as in a variety of reference books, such as "Microsoft Win32 Programmers Reference" published by Microsoft Press.

As is well-known among software developers, the Windows API includes a number of functions to allow applications to create a windowing interface. A window is a rectangular area of the display screen where an application displays output and receives input from the user. The user can use a mouse, keyboard or other input device to interact with a window and an application that controls it. The Win32 API includes functions that applications use to create and use windows, manage relationships among windows, and display a window.

Applications define the general behavior and appearance of their windows by creating window classes and corresponding window procedures. A window class is a set of attributes that the operating system uses to create a window for an application. The window class identifies default characteristics, such as whether the window processes double-clicks of the mouse buttons or has a menu. Each window class has an associated window procedure shared by all windows of the same class. The window procedure processes messages for all windows of a class, and therefore, controls the behavior and appearance of windows in the class. The window procedure contains the code that defines the behavior of the window, carries out requested tasks, and processes user input.

A window typically includes a number of controls to carry out input and output tasks. A control is a child window that an application uses in conjunction with another window to perform input and output tasks. As a child window, a control sends messages, called notification messages, to its parent window when events, such as input from the user occur in the control.

In this particular embodiment, a graphical user interface, including a new control called a "tree control," is implemented using the Windows API. The user interface application presents a main window, and one or more child windows acting as place-holders for displaying tree controls. The tree controls, in turn, are child controls of the place-holder windows.

While these tree controls can be incorporated into a variety of applications, we describe one embodiment specifically relating to a graphical user interface for Microsoft SQL Server database management systems. In a typical network configuration, an organization can have a number of SQL Servers distributed across a network. The user interface for SQL Server enables users to browse and navigate a hierarchical tree of SQL Servers and their contents.

Before describing the details of the tree control, it is helpful to explain the concept of tree structure.

Figure 2:
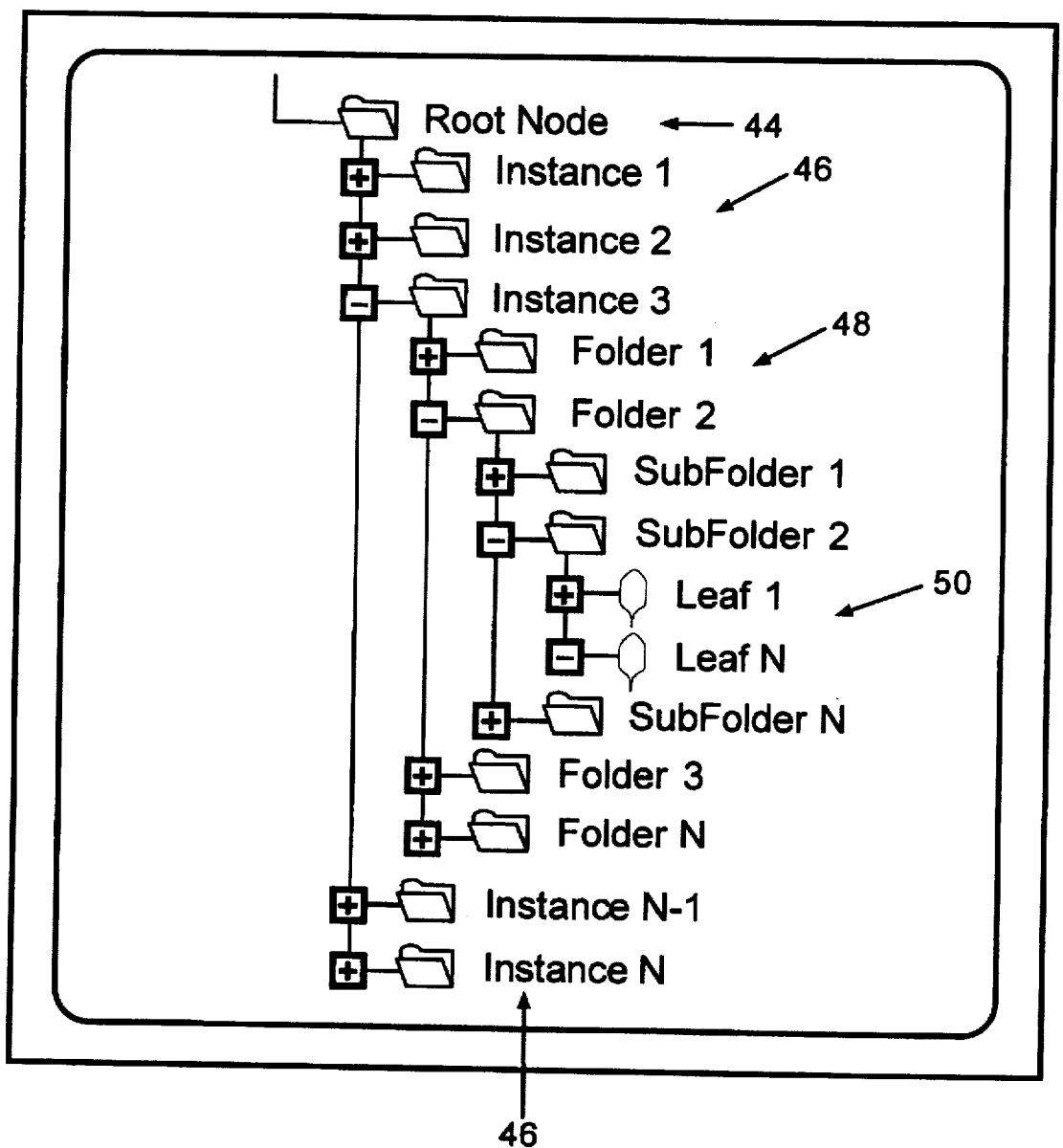
FIG. 2 illustrates a general example of a hierarchical tree structure.

FIG. 2 illustrates a window displaying a hierarchical tree structure. This example depicts the basic structure of a typical tree. The root node 44 is the highest level of the hierarchy. Under the root node 44, there are several instances of child nodes 46 where N is number representing an arbitrary number of nodes. For simplicity, the entire tree is shown within a window, but often an entire tree cannot fit into a single window on the display screen.

Each child node can have additional child nodes. For example, instance N-2 is expanded into a number of child nodes named folders 48. Folder 2 is expanded into sub-folders named 1 and 2. Finally, sub-folder 2 is expanded into child nodes, leaves 1 through N. Having no child nodes, a leaf node 50 is the lowest level of hierarchy. While the names of the nodes, their physical appearance, and the allowed number of levels can vary depending on the application, the tree structure provides a general example of a hierarchical tree structure.

Figure 3:
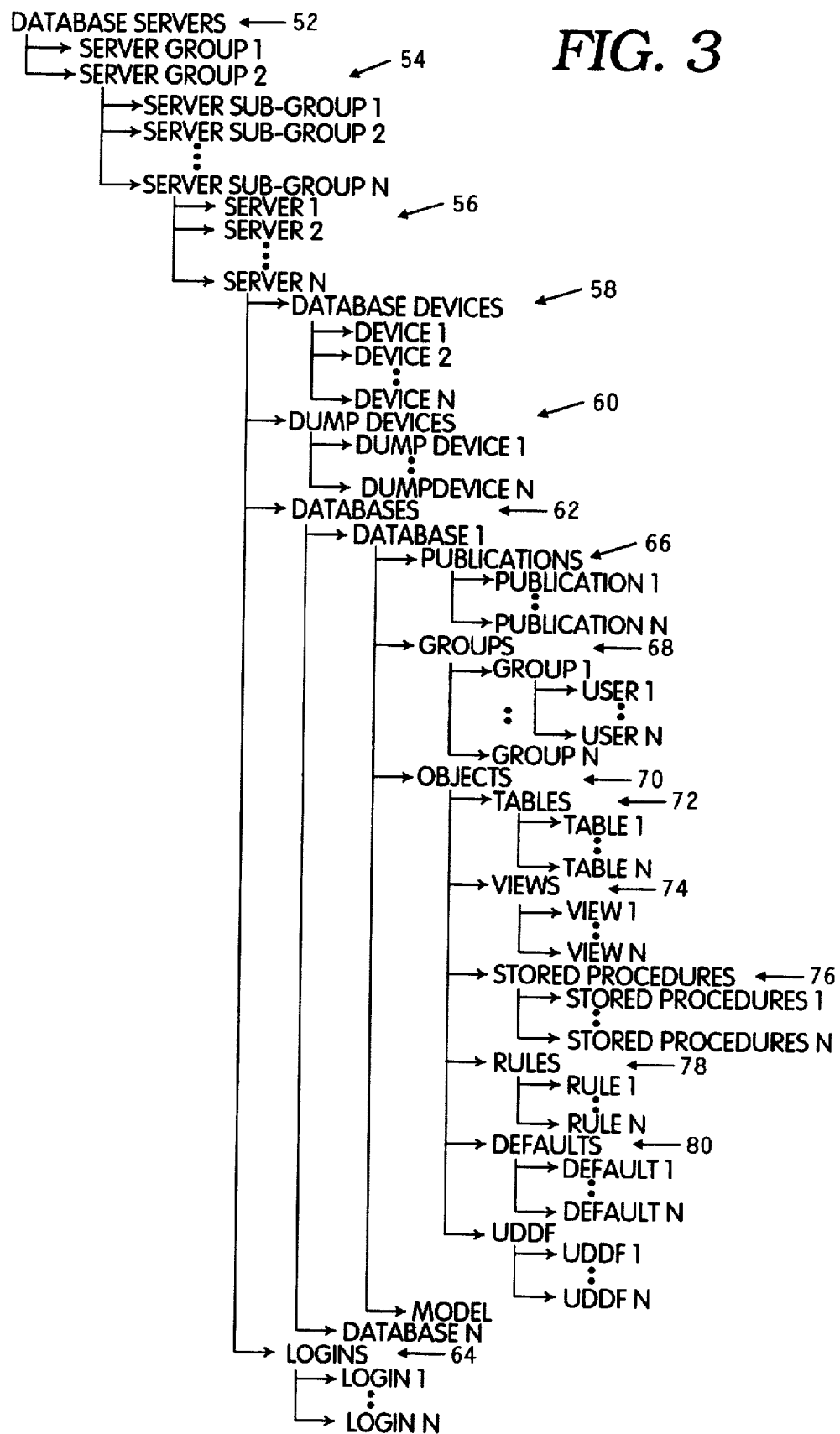
FIG. 3 illustrates an example of a hierarchical tree structure in the context of a network database application.

FIG. 3 illustrates an example of a hierarchical tree structure in the context of a network database application such as Microsoft SQL Server. In FIG. 3, the tree is not bounded by a window so that the tree can be shown in its entirety. The name of the root node 52 is "DATABASE SERVERS" to identify that the tree represents information associated with database servers and their contents. The first and second level of child nodes represent server groups 54. Servers pertaining to a particular division in a company or a particular product is one example of how servers can be grouped. In the Microsoft SQL Server product, servers can be grouped into 100 levels of hierarchy.

In each server group, there can be a number of child nodes representing servers 56. In this example, server sub-group N is expanded into servers 1 through N. Server N is then expanded to illustrate the resources associated with it. The resources associated with the server include database devices 58, dump devices 60, databases 62, and logins 64. Database and dump devices are expanded into a number of device instances. Database 1 is expanded into a number of child nodes including publications 66, groups 68, and objects 70. The Objects node 70 is expanded into a number of child nodes including tables 72, views 74, stored procedures 76, rules 78, defaults 80, and user-defined data files (UDDF) 82.

Figure 4:
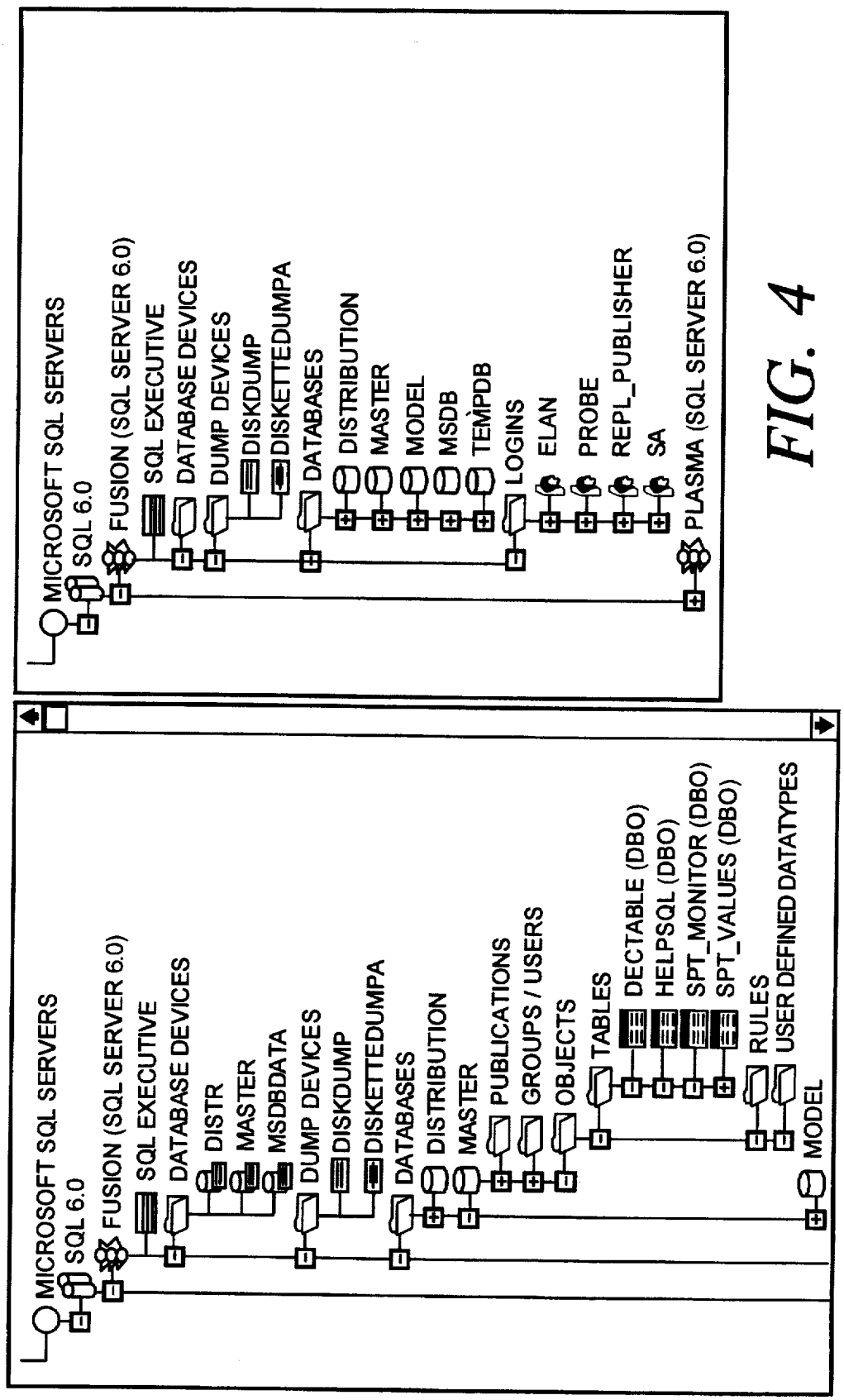
FIG. 4 illustrates a more specific example of a hierarchical tree structure in the context of a network database application.

FIG. 4 illustrates a more specific examples of a hierarchical tree structure in the context of a network database application. FIG. 4 shows two windows, each containing a hierarchical tree structure of a Microsoft SQL server application. The tree structure on the right fits entirely in a window. However, when expanded, as shown on the left, the entire tree structure is not visible in the window. The user can use the scroll bar to browse through the tree structure on the left. As is apparent from these examples, it is difficult for a user to navigate this tree if only a small portion can be displayed in a window at once.

The windows used to contain a graphical tree control in the user interface are based on the Multiple Document Interface (MDI) specification. As described in the MDI specification, the main window of the user interface application is the frame window. The client area of the frame window is an MDI client window, which serves as a host for child MDI windows. More information regarding the MDI specification is available in the Windows® 95 Software Development Kit, Chapter 27, entitled "Multiple Document Interface," from Microsoft Corporation, which is hereby incorporated by reference. A copy of this chapter is available in the file history of this document. The MDI specification defines a standard windowing interface for applications written for the Windows Operating System from Microsoft. For this application, MDI windows act are place-holders for the tree controls.

To make it easier to view portions of a complex tree, the user interface allows a user to "rip" or break up a tree control into smaller portions and display the portion or portions in separate windows. The primary instance of a tree is the "parent tree." When the user creates new tree controls by ripping the parent tree, the application creates a child tree. The parent tree control is displayed in a child MDI window, and similarly, a child tree created from a portion ripped off the parent tree control is displayed in another child MDI.

In the context of the Windows development environment, tree controls are windows having a window class and associated window procedure. The window class defines the general behavior and appearance of a tree control, including a number of styles used to define an instance of a tree. When the application creates a new instance of a tree control, the styles specified for the new instance define its behavior. The master and client styles are central to the relationship among tree controls created during the ripping process.

When new instances are created during the ripping process, the instances have a master-client relationship. A master tree control owns the data associated with a tree. A client tree control includes display status data, but must refer back to the master for data regarding nodes associated with it. This master-client relationship allows the application to process the underlying tree data in an organized fashion because there is only one copy of it, and all changes must occur through this "master" copy.

The master-client relationship enables a graphical representation of a tree to be ripped into separate portions, and displayed separately. A user can view, navigate and even edit data displayed in any tree control, whether it is a master or client. When a user changes a node in a tree control, the master updates the underlying data and sends messages to the clients to update their display status.

Figure 5:
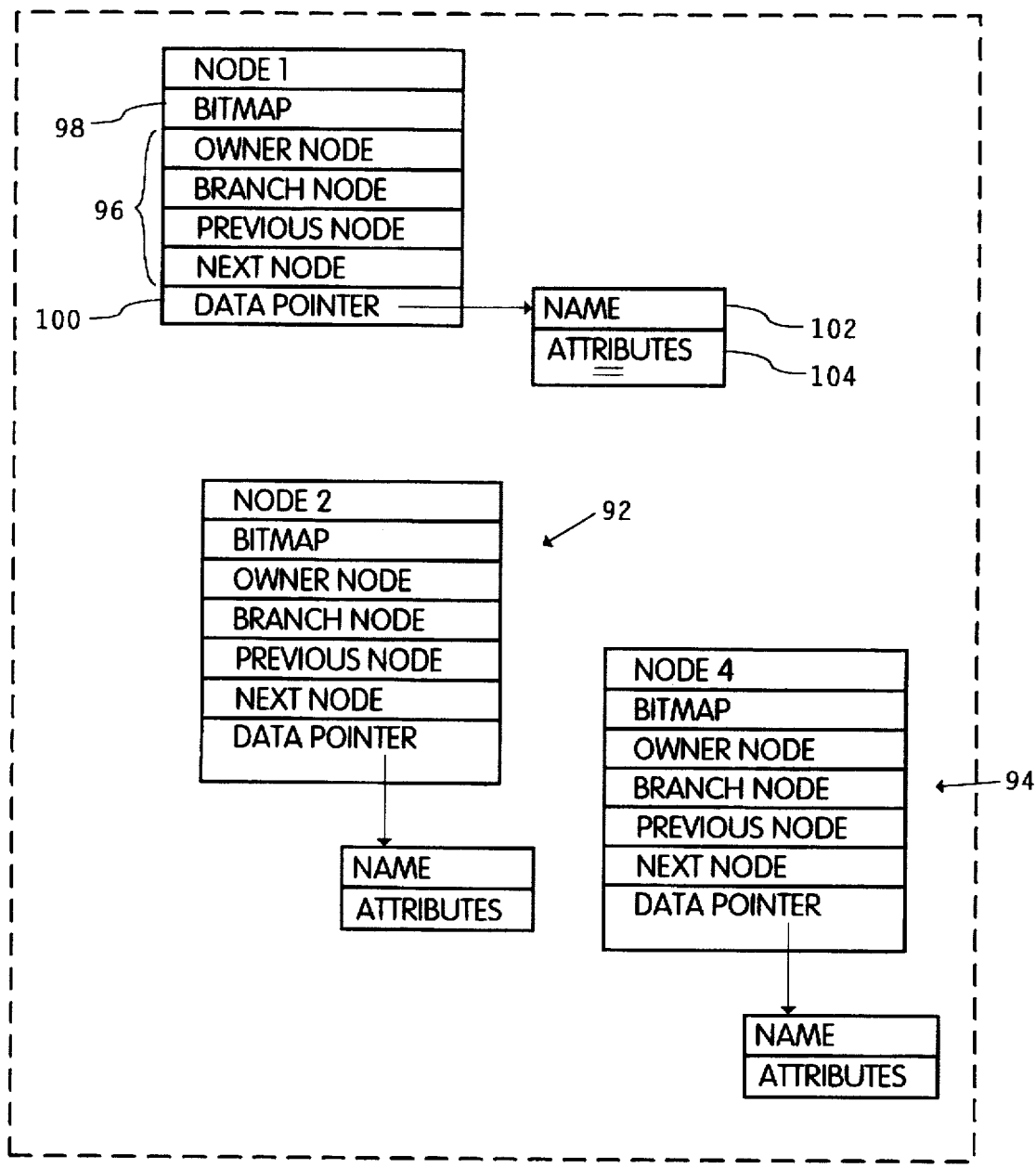
FIG. 5 depicts a number of node entity structures that represent the underlying node data of a tree control.
Figure 6:
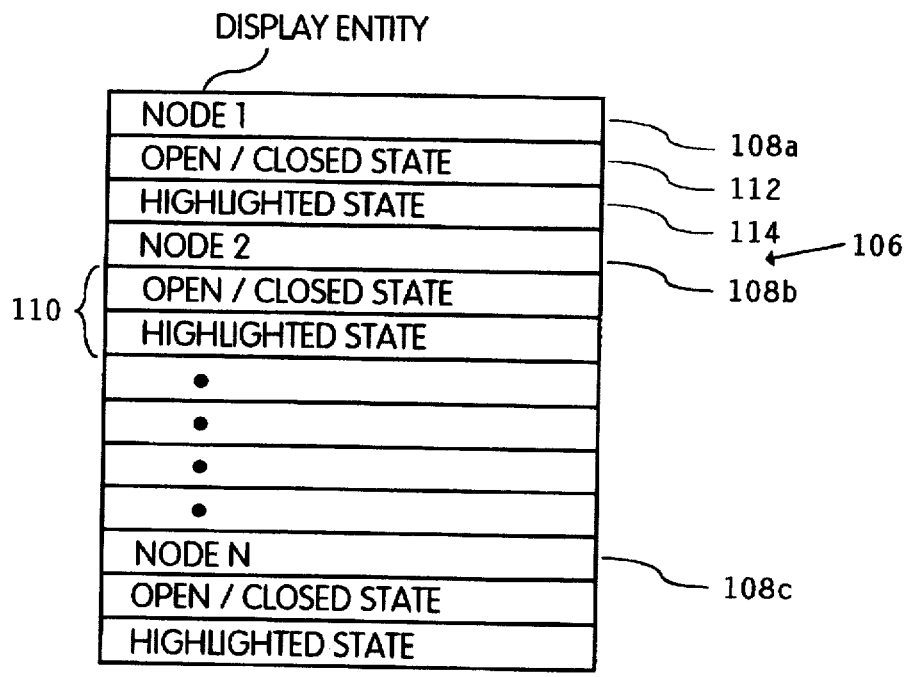
FIG. 6 depicts an example of a display entity structure that represents display state data for a tree control.

When the application creates a tree control, it specifies a master or client style flag to specify whether the new control is a master or a client. The application binds the underlying node data and display data with the master control. When the application creates a client, it binds display data but not node data. The underlying node data includes such information as a description of the tree's hierarchical structure, bitmaps, name, and attributes. The display data relates to the status of the nodes in the display such as whether it is currently highlighted or whether a node is expanded or collapsed (i.e. opened or closed). FIGS. 5 and 6 illustrate the structure of the node and display data. FIG. 5 depicts a number of node entities 90–94 that represent the underlying node data. For every node in a tree, there is a corresponding node entity. The node entities in a tree include data describing the hierarchy of the tree 96, a handle to a bitmap 98 corresponding to each node, and data pointers 100 to the underlying data that the node represents such as the name of the node and attributes 102, 104 of the underlying data. Together, the node entities 90–94 represent the node data of the master tree.

FIG. 6 depicts a display entity 106. For every master and client tree in a child MDI window, there is a display entity.

The display entity 106 describes the display state of a tree control. A more detailed description of node and display entities follows below.

Returning again to FIG. 5, the master includes a number of node entities. This particular example illustrates three node entities corresponding to node 1, node 2, and node N. The reference to the arbitrary number of nodes reflects that the master can comprise a range of node entities. Each node entity occupies a portion of the heap memory in the computer system where the application is installed. Since node entities need not occupy contiguous memory sections, they are shown separately.

As outlined generally above, node entities include hierarchy data. In this embodiment, each node entity represents hierarchy by specifying a pointer to related nodes. For instance, in node 1 there is a pointer to an owner node, which is the immediate parent node. There are pointers to the previous and next nodes. Finally, there is a pointer to the branch node. The branch node represents the first child node. Each of the nodes shown in FIG. 5 include owner, branch, previous and next nodes, but every node does not necessarily include all of these node types. A root node has no owner node, and a leaf node has no branch nodes. The node entity only includes pointers to its neighbors, and where no neighbor exist, the node entity does not include a pointer for that neighbor.

Each node also includes a corresponding bitmap to represent the graphical appearance of the node. This bitmap depicts a graphical representation of the type of data that the node represents. Examples of bitmaps include a folder or database symbol, or a traffic light symbol representing the run-state of a server.

The node entity also includes data pointers to the name and attributes of the node. The pointer to the name points to a character string representing the name of the computer resource that the node represents. This can be, for example, the name of a document file, a database file, a server, etc. The attributes are application specific data maintained by the tree control. Typical attributes for a database application include a database date and size, and the last time the database was dumped.

In addition to a number of node entities, the master or parent tree has a corresponding display entity 106. FIG. 6 illustrates an example of a display entity corresponding to the node entities of FIG. 4. The display entity includes a pointer 108A–C to each node entity in the tree. Associated with each node, display state variables 110 represent the display state of the node. These state variables include whether the node is opened or closed (112), and whether the node is highlighted (114). When a user positions the cursor over a portion of the tree control that appears as a plus/minus symbol in a box, a mouse click on this symbol expands or collapses a node, depending on its current state. For instance, if a user positions the cursor over a minus symbol representing a collapsed node and clicks on the left mouse button, the user interface expands the node, changing the status of the expanded node to open. Other display status data, such as whether a node is highlighted, can also be stored in the display entity.

Figure 7:
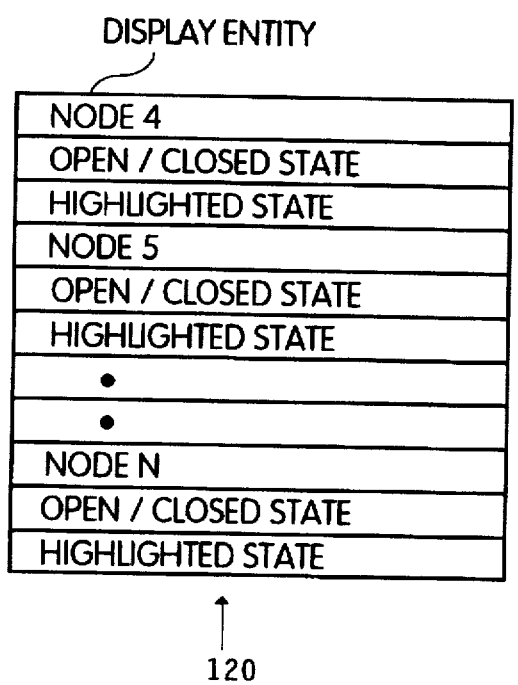
FIG. 7 illustrates another example of a display entity.

The display entity 106 associated with the master includes status data for each node in the master. When the user creates a child tree, the application creates a new display entity for the child tree. FIG. 7 illustrates an example of a display entity 120 for a child tree control. If node 4 is ripped from a parent tree control, the resulting child tree control includes nodes 4 through N. The display entity 120 associated with this new control has display state data for nodes 4 through N. In addition, the display entity includes pointers to the node entities in the master that correspond to the nodes in the child tree.

Figure 8A:
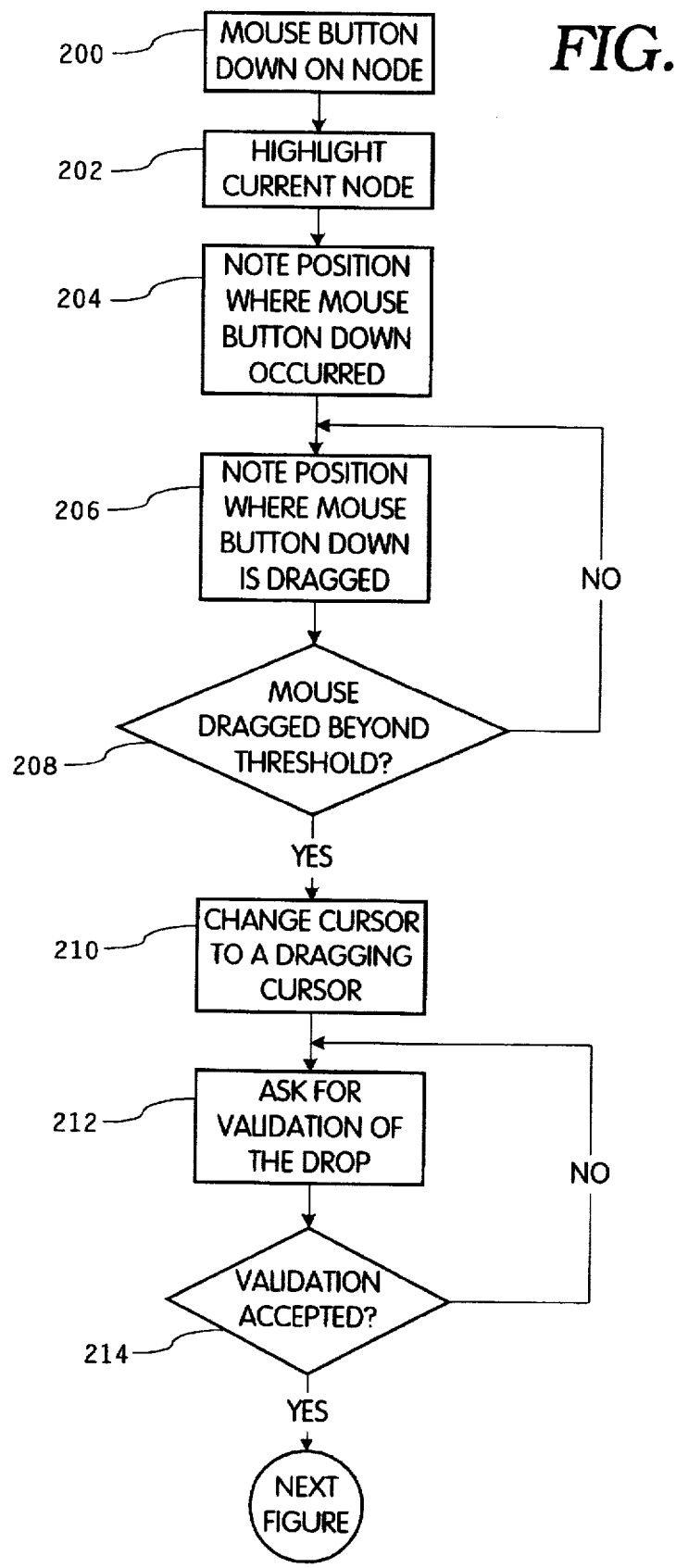
FIGS. 8A and 8B illustrate the process of separating or "ripping" a tree control into another tree control according to an embodiment of the invention.
Figure 8B:
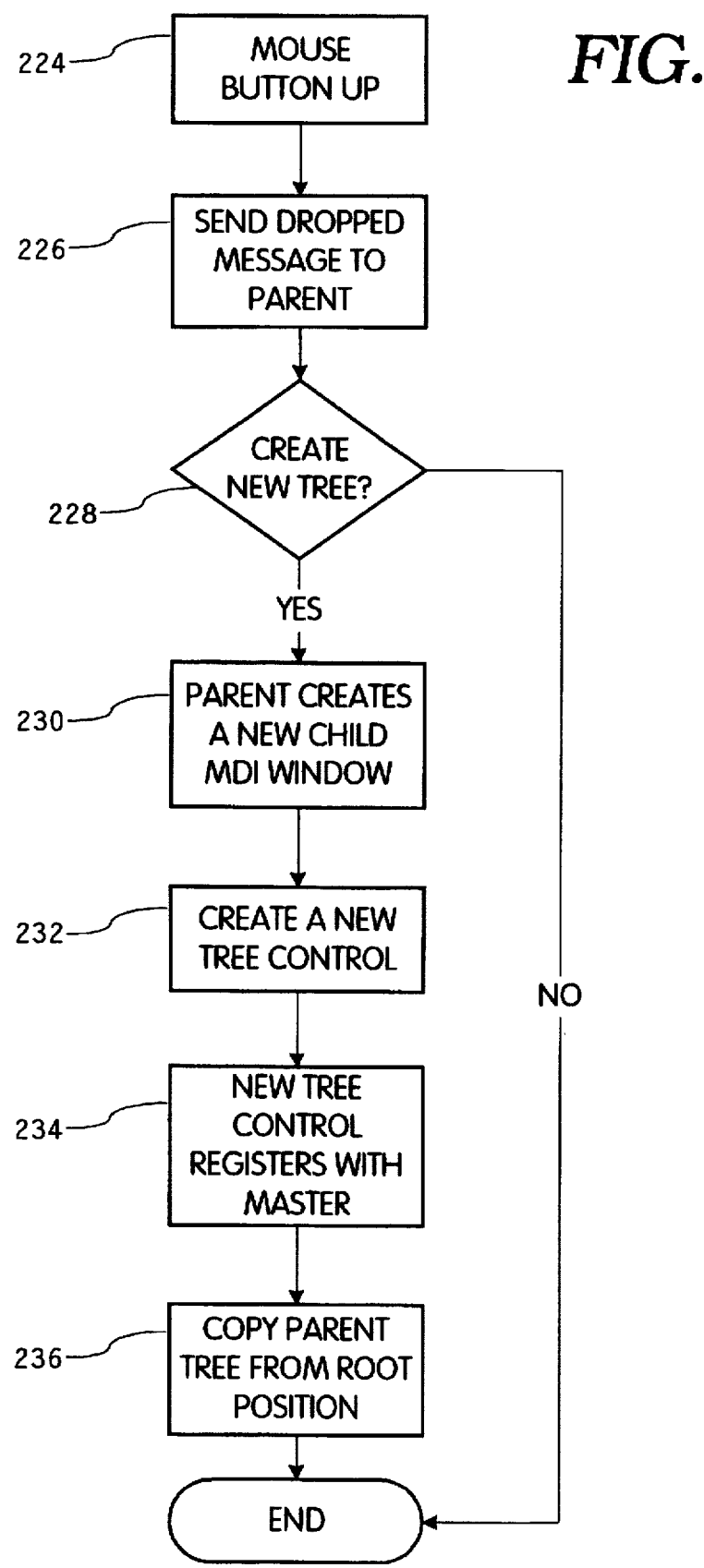

Having described node and display entities, we now describe the process of ripping a tree to form a smaller, more manageable tree. FIGS. 8A and 8B illustrate the process of ripping a tree.

The process begins when a user positions the cursor over a bitmap representing a node on the display screen. Step 200 represents the act of clicking on the mouse when the cursor is positioned over a node. In response to this input, the operating system sends a message to the tree control indicating the input has occurred. In the next step 202, the tree control changes the display state of the node to a highlighted state.

When mouse button down occurs, the tree control also notes the position where the mouse button down has occurred as shown in step 204.

The window holding the tree control receives messages informing it of the movement and position of the cursor as well as changes in the state of the mouse button. As it receives these messages, it notes the position of the cursor as shown in step 206 to determine whether the user is trying to drag a node in the tree control.

If the user drags the mouse with the mouse button down a distance of 4 pixels from its original position, then the window switches the cursor to drag mode. The process of checking whether this threshold is surpassed is reflected in step 208. The window always continues to monitor the cursor position as reflected in the feedback loop to step 206. Of course, a variety of user inputs are possible and this diagram cannot reflect each of these inputs or combinations of inputs. This diagram tracks an example of the steps that generally occur during the drag and drop process, but does not necessarily include all scenarios where a user makes a mistake or changes his/her mind.

After the user has dragged the cursor for a pre-defined number of pixels, the window updates the display status of the cursor to give the user feedback that he/she is in the drag mode. In this implementation, the change in the cursor state is reflected as a change in the appearance of the cursor as shown in step 210.

During drag mode, the tree control enters a validation process reflected in steps 212 and 214. This process determines whether the tree control can be dropped in a particular location. This process can be applied to other actions such as moving nodes in a tree control, but this diagram focuses on checking whether a new child tree control can be created. As the user drags the cursor in drag mode, the tree control asks for validation of a drop as shown in step 214. If the validation is not accepted, the process continues as represented by the loop from decision step 214 back to step 212.

Figure 9:
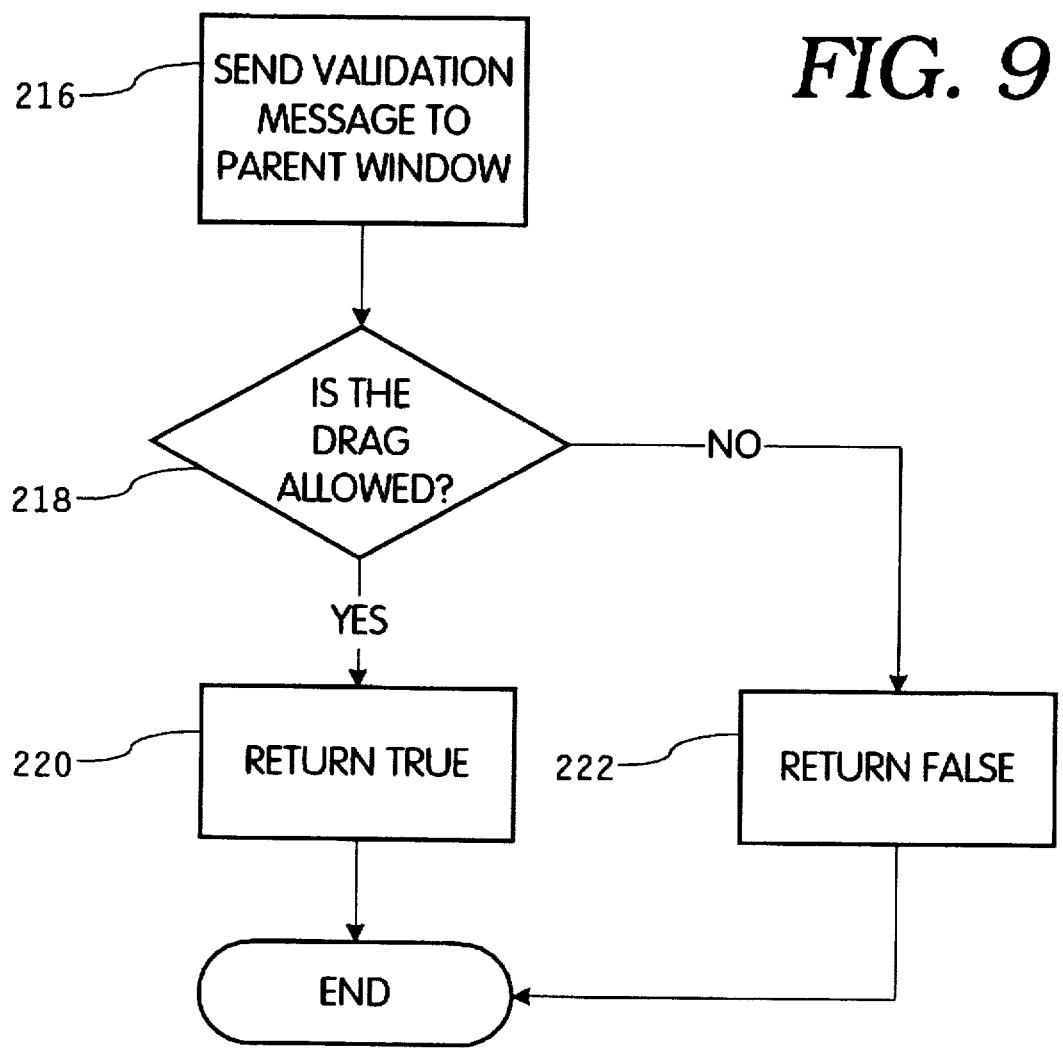
FIG. 9 illustrates in more detail one aspect of the ripping process of FIGS. 8A and 8B.

FIG. 9 illustrates validation in more detail. In step 216, the tree control sends a message requesting validation for a drop to its parent window. In this case, the parent window is the MDI shell holding the tree control. To identify the cursor location, the validation message includes the window handle and ID of the window currently holding the cursor.

In decision step 218, the parent determines whether the drag is allowed from the information in the validation message. The parent determines whether the drag is allowed by comparing the window ID with the window ID of the MDI client. This comparison indicates whether the cursor has moved into the MDI client area or remains in the child MDI window. The parent returns the value, true, if the drag is allowed, and it returns the value, false, if the drag is not allowed as shown in steps 220 and 222.

Turning now to FIG. 8B, the user ultimately releases the mouse button indicating that he/she wants to "drop" a new tree control. This user input is represented as step 224. In response to the user releasing the mouse button, a "dropped" message is sent to the parent of the tree control as shown in step 226. This dropped message specifies the window handle and ID of the window where the cursor is located when the user releases the mouse button.

With the window handle and ID from the dropped message, the parent window can determine whether to create a new tree. If a drop is validated as set forth above and the cursor is positioned in the client MDI window, then the parent window initiates the steps to create a new child tree control. The determination as to whether a new tree should be created is represented as decision step 228. If the preconditions for creating a new tree are not satisfied, then the release of the mouse button will not result in the creation of a child tree.

When a drop is validated and the cursor is in the client MDI window, the parent window creates a new child MDI window as shown in step 230. This new child MIDI window will serve as a placeholder for the new tree control. Though this example involves creating a new child MDI window, it is also possible to separate the window holding the parent into two discrete areas. For instance, the parent could be split down the center into first and second areas. The child tree control could then be drawn in the second area. A vertical scroll bar could be added to this second area to enable the user to separately navigate the child tree control. A number of variations are possible by dividing the display screen into sections or creating new, tiled or overlapping windows to serve as placeholders for tree controls.

In step 232, the new MDI window creates a new tree control specifying the client style flag. The client style flag indicates that this new instance of a tree control is to respond to messages from the master tree and is to derive its node data from the master. The parent specifies the identity of the node that has been ripped from the original tree control and the window handle of the master.

The new tree control then sends a message to the master to register itself as shown in step 234. The new tree control obtains display state information by taking a snap shot of the display entity associated with the master. As represented by step 236, the display state data is copied for each node in the new control starting with the node that has just been ripped from the parent tree. This completes the process of ripping a parent tree to create a child tree.

Any number of child trees can be created by this process. A number of master trees can be opened at once. From each of these masters, the user can create one or more child trees. A user can also create several layers of child trees from a single master.

Once a child tree is created, it maintains a master-client relationship with the master. All actions are centered on the master. When a user edits a tree control, the tree control reports the change to the master, which then updates itself if necessary and propagates changes to related tree controls. Related tree controls include each control containing the revised node or nodes.

Figure 10:
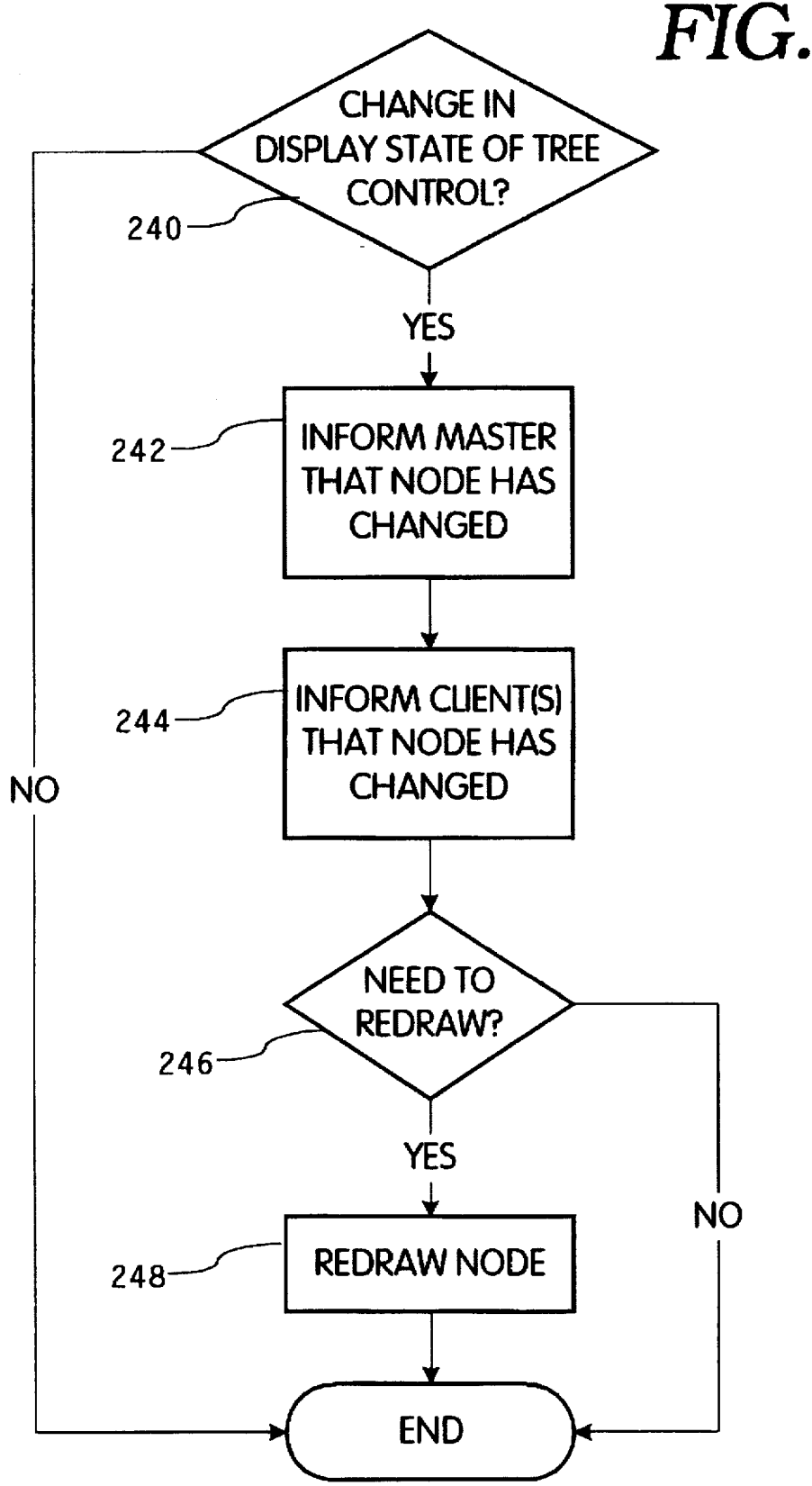
FIG. 10 illustrates how the master control communicates changes to related tree controls according to an embodiment of the invention.

FIG. 10 illustrates how the master control communicates changes to related tree controls. If a user changes a node in a tree control as shown in decision step 240, then the tree control reports the change to the master in step 242. The master then informs related client or clients of the change by sending a notification message to the client tree controls in step 244.

Each client then determines whether it has to redraw itself because of the change. In decision step 246, the client determines whether it has to redraw itself because of the change. The client does not have to redraw itself if it is not affected by the change. However, if the change to the master affects a client, it must redraw itself to reflect the change as shown in step 248. This completes the general case where a user action results in a change to a tree control.

Figure 11:
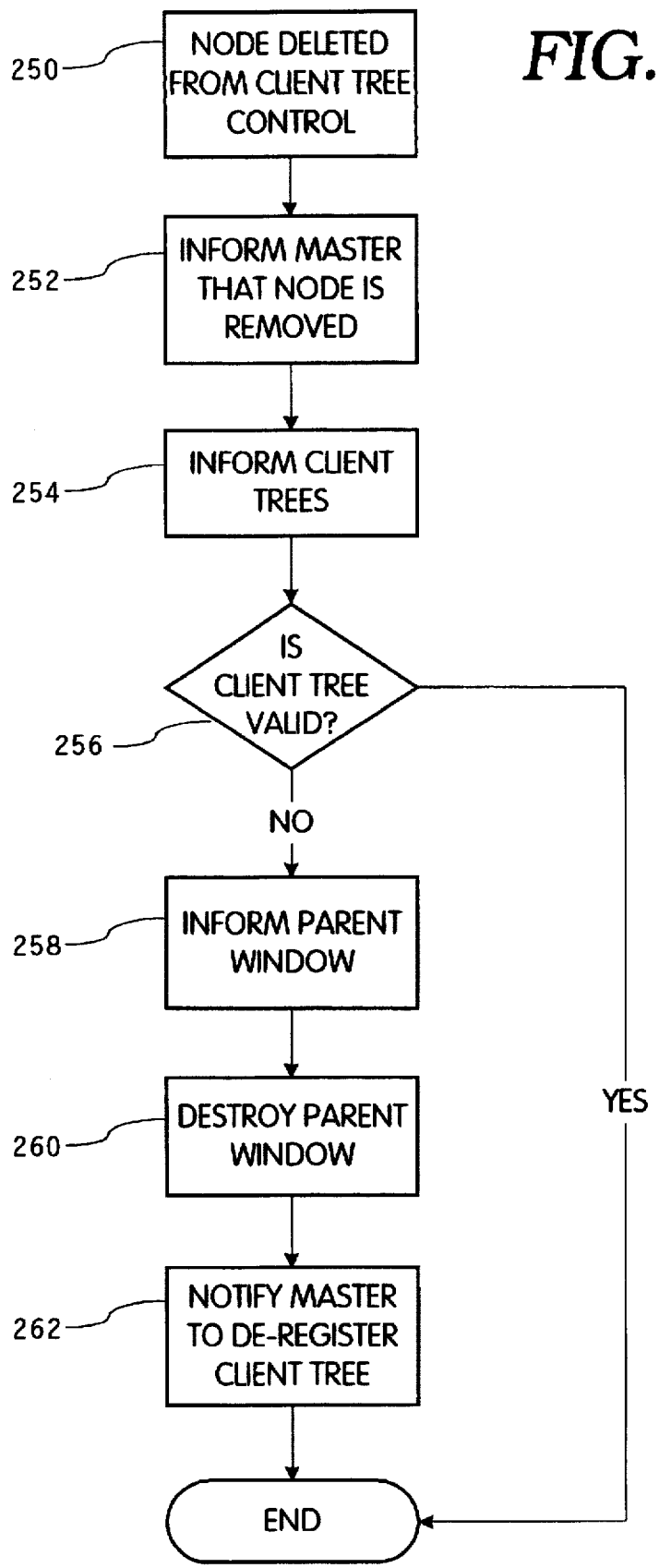
FIG. 11 depicts an example of how a change in a child tree control is controlled through the master tree control.

FIG. 11 depicts an example of how a change in a child control is controlled through the master. In this example, the user deletes a node from a child tree control. The process begins with step 250 when the user deletes a node from a child tree control. In response, the tree control informs the master that the user has deleted a node in step 252. The master removes the node entity corresponding to the deleted node, and it updates other node entities to reflect the absence of the deleted node entity. This process includes changing the hierarchical data of the surrounding nodes to reflect the correct relationship among the nodes.

The master then sends a message to each client, i.e. the child tree controls created from the master, informing them that a node has been deleted. Each child tree control receiving this message then determines whether it is still valid. A child tree determines whether the deletion of the node eliminates it entirely by comparing the deleted node with its root node. If the deleted node is the root node of the child tree, or is a parent node of its root node, then the entire child tree is invalid. If the deleted node is a node in the child tree, but is not its root node, then only the portion relating to the deleted node is invalid. In this case, the child tree redraws itself as generally described with reference to FIG. 10.

Decision step 256 represents the process of determining whether a child tree control is still valid after the user has deleted the node. If a child tree is invalid, then steps 258-262 represent the process of destroying an invalid child control. In step 258, the tree control sends a destroy message to its parent MDI window, which indicates that it should destroy itself. The MDI window holding the tree control then destroys itself as shown in step 260. In the process of destroying itself, the child tree control sends a message to the master to de-register itself as a client of the master. Shown as step 262, the process of de-registering involves removing the window handle corresponding to the child tree control from the master. The master no longer sends notification messages to the child tree control because it no longer has a window handle to the child tree control.

While we have described in detail an embodiment of the invention, it should be understood that the implementation of the invention can vary.

In view of the many possible embodiments to which the principles of our invention may be put, it is emphasized that the detailed embodiment described herein is illustrative only and should not be taken as limiting the scope of our invention. Rather, we claim as our invention all such embodiments as may come within the scope and spirit of the following claims and equivalents thereto.

We claim:

1. A method for interactively displaying a tree structure for representing hierarchical data in a programmed computer system, the method comprising:

storing a master tree structure in memory of the programmed computer system;

displaying in a first window a hierarchical master tree control corresponding to at least a portion of the master tree structure;

in response to user requests to expand and collapse a level of the hierarchical master tree control, expanding the level and collapsing the level, respectively, in the first window;

in response to a user command to separate the master tree control into a hierarchical client tree control beginning at a user-specified node in the master tree control:

creating the hierarchical client tree control;

creating a second window for displaying the hierarchical client tree control;

displaying the client tree control in the second window with the user-specified node forming a root node of the client tree control; and in response to user requests to expand and collapse a level of the hierarchical client tree control, expanding the level and collapsing the level, respectively, in the second window.

2. The method of claim 1 further including the steps of:

receiving user input messages describing position of an input cursor and state of an input button on a pointing device;

from the user input messages describing the position of the input cursor and the state of the input button, determining whether the user has entered the user command to separate the master tree control into a client tree control.

3. The method of claim 2 wherein the user input messages correspond to input messages generated in the programmed computer system when a user positions the input cursor over the user-specified node, activates the input button on the pointing device, and moves the input cursor across the display screen; and wherein determining step includes determining whether the user has moved the input cursor to a particular location on the display screen to allow the hierarchical client tree control to be created.

4. The method of claim 1 further including the steps of:

processing changes to the client tree control in the second window by:

receiving an editing command to change the client tree control in the second window;

reporting the editing command to the master tree control; and updating the master tree structure according to the editing command.

5. The method of claim 1 further including the steps of:

in response to a second user command to separate the master tree control into a second client tree control beginning at a user-specified node in the master tree control:

creating a third window for displaying the second client tree control; and displaying the second client tree control in the third window with the user-specified node forming a root node of the second client tree control.

6. The method of claim 1 wherein the master tree structure includes hierarchical data for the master tree control and the client tree control.

7. The method of claim 1 wherein one or more client tree controls are created using the following steps:

in response to a user command to separate the master tree control into new client tree control beginning at a user-specified node in the master tree control:

creating another window for displaying the new client tree control; and displaying the new client tree control in the another window with the user-specified node forming a root node of the client tree control.

8. The method of claim 1 wherein the master tree structure is associated with display status data representing display status of nodes in the master tree control.

9. The method of claim 8 further comprising the step of creating the client tree control by copying display status data for each node in the client tree from the display status data associated with the master tree structure.

10. A computer-readable medium having computer-executable instructions for performing the steps recited in claim 1.

11. A method for interactively displaying a tree structure representing hierarchical data in a programmed computer system, the method comprising:

storing a master tree structure including hierarchy data and display state data;

displaying a hierarchical master tree control corresponding to the master tree structure in a first window;

in response to a user command to separate the hierarchical master tree control into a client tree control, creating a hierarchical client tree control from the display state data of the master tree structure;

displaying the client tree control in a second window; and in response to user requests to expand and collapse a level of the hierarchical client tree control, expanding the level and collapsing the level, respectively, in the second window.

12. The method of claim 11 further including the steps of:

in response to a user command to edit the client tree control, updating the hierarchy and display state data of the master tree structure; and updating the display state of the client tree control.

13. The method of claim 10 wherein the user command to edit the client tree control is expanding the a node in the client tree control to display one or more related branch nodes to the node.

14. The method of claim 10 wherein the user command to edit the client tree control is deleting a node.

15. The method of claim 11 wherein the master tree structure is represented in memory as related node entities, each node entity including hierarchical data and a graphical description of a node.

16. The method of claim 11 wherein the master tree structure is represented in memory as related node entities, each node entity including hierarchical data and a graphical description of a node, and each node entity corresponding to a display entity storing the display state data.

17. A computer-readable medium having computer-executable instructions for performing the steps recited in claim 11.

18. A method for interactively displaying a tree structure for representing hierarchical data on a display screen of a programmed computer system, the method comprising:

storing a master tree structure in memory of the programmed computer system;

displaying in a first area of the display screen a hierarchical master tree control corresponding to at least a portion of the master tree structure; and in response to a user command to separate the hierarchical master tree control into a hierarchical client tree control beginning at a user-specified node in the master tree control:

displaying the client tree control in a second area of the display screen window with the user-specified node forming a root node of the hierarchical client tree control; and in response to user requests to expand and collapse a level of the hierarchical client tree control, expanding the level and collapsing the level respectively, in the second area of the display screen.

19. The method of claim 18 wherein the first area is a first window on the display screen, and the second area is a section within the first window.

20. The method of claim 18 wherein the first area is a first window on the display screen, and the second area is a second window on the display screen.

21. The method of claim 20 wherein additional client tree controls are created using the following steps:

in response to a user command to separate the master tree control into new client tree control beginning at a user-specified node in the master tree control:

creating an additional window for displaying the new client tree control; and displaying the new client tree control in the additional window with the user-specified node forming a root node of the client tree control.

22. The method of claim 18 further including the steps of:

receiving user input messages describing position of an input cursor and state of an input button on a pointing device;

from the user input messages describing the position of the input cursor and the state of the input button, determining whether the user has entered the user command to separate the master tree control into a client tree control.

23. The method of claim 18 further including the steps of:

processing changes to the client tree control in the second area by:

receiving an editing command to change the client tree control in the second area;

reporting the editing command to the master tree control; and updating the master tree structure according to the editing command.

24. A computer-readable medium having computer-executable instructions for performing the steps recited in claim 18.

* * * * *